United States Patent
Baset et al.

(10) Patent No.: US 9,483,383 B2
(45) Date of Patent: Nov. 1, 2016

(54) INJECTING FAULTS AT SELECT EXECUTION POINTS OF DISTRIBUTED APPLICATIONS

(71) Applicant: International Business Machines Corporation, Armonk, NY (US)

(72) Inventors: Salman A. Baset, New York, NY (US); Cuong M. Pham, Urbana, IL (US); Harigovind V. Ramasamy, Ossining, NY (US); Manas Singh, Chappaqua, NY (US); Byung Chul Tak, Peekskill, NY (US); Chunqiang Tang, Ossining, NY (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/097,713

(22) Filed: Dec. 5, 2013

(65) Prior Publication Data

US 2015/0161025 A1 Jun. 11, 2015

(51) Int. Cl.
*G06F 11/36* (2006.01)
*G06F 11/30* (2006.01)
*G06F 11/20* (2006.01)
*H04L 12/26* (2006.01)

(52) U.S. Cl.
CPC ....... *G06F 11/3644* (2013.01); *G06F 11/2023* (2013.01); *G06F 11/2028* (2013.01); *G06F 11/2033* (2013.01); *G06F 11/3006* (2013.01); *G06F 11/3612* (2013.01); *H04L 43/0805* (2013.01)

(58) Field of Classification Search
None
See application file for complete search history.

(56) References Cited

U.S. PATENT DOCUMENTS

| | | | | |
|---|---|---|---|---|
| 6,477,666 B1* | 11/2002 | Sanchez | ............. | G06F 11/3688 714/38.12 |
| 6,484,276 B1* | 11/2002 | Singh | .................... | G06F 11/263 714/38.13 |
| 7,827,438 B2 | 11/2010 | Tarta | | |
| 8,046,639 B1* | 10/2011 | Nordin | ................ | G06F 11/2268 714/32 |
| 8,271,932 B2* | 9/2012 | Bair | .................... | G06F 11/1008 324/527 |
| 2006/0271825 A1* | 11/2006 | Keaffaber | ........... | G06F 11/3688 714/38.13 |
| 2007/0050740 A1* | 3/2007 | Jacobi | ................... | G06F 17/504 716/103 |

(Continued)

OTHER PUBLICATIONS

Chandra et al. A Global-State-Triggered Fault Injector for Distributed System Evaluation, Parallel and Distributed Systems, IEEE Transactions on 15, No. 7 (2004): 593-605.

(Continued)

*Primary Examiner* — Albert Decady
*Assistant Examiner* — Paul Contino
(74) *Attorney, Agent, or Firm* — Ryan, Mason & Lewis, LLP

(57) ABSTRACT

Methods, systems, and articles of manufacture for injecting faults at select execution points of distributed applications are provided herein. A method includes monitoring a run-time state of each of multiple components of a distributed application to determine one or more sequence of events that triggers a fault injection point at one of the multiple components; defining a fault injection scenario in a specification based on said monitoring, wherein said fault injection scenario comprises a description of one or more sequence of events during which an intended fault is to be injected to a target component of the multiple components at one selected event; and executing the fault injection defined in the specification to perform injection of the intended fault during run-time of the distributed application.

11 Claims, 6 Drawing Sheets

(56) References Cited

U.S. PATENT DOCUMENTS

| | | | |
|---|---|---|---|
| 2007/0271082 A1* | 11/2007 | Dominguez | G06F 11/261 703/20 |
| 2008/0134160 A1* | 6/2008 | Belapurkar | G06F 11/3668 717/154 |
| 2008/0215925 A1 | 9/2008 | Degenaro et al. | |
| 2008/0307258 A1* | 12/2008 | Challenger | G06F 11/1438 714/20 |
| 2011/0178788 A1 | 7/2011 | Liu et al. | |
| 2011/0289487 A1* | 11/2011 | Song | G06F 11/3624 717/130 |
| 2012/0222012 A1* | 8/2012 | Song | G06F 11/3624 717/124 |
| 2012/0317533 A1* | 12/2012 | Zawalski | G06F 17/5027 716/136 |
| 2014/0136896 A1* | 5/2014 | Tak | G06F 11/079 714/26 |
| 2014/0298082 A1* | 10/2014 | Rikitake | G06F 11/2007 714/4.11 |
| 2014/0351797 A1* | 11/2014 | Kalayci | G06F 11/3696 717/127 |
| 2015/0369865 A1* | 12/2015 | Hershman | H03K 19/003 326/8 |

OTHER PUBLICATIONS

Hoarau et al. A Language-Driven Tool for Fault Injection in Distributed Systems, in Proceedings of the 6th IEEE/ACM International Workshop on Grid Computing, pp. 194-201, IEEE Computer Society, 2005.

Stott et al. NFTAPE: Networked Fault Tolerance and Performance Evaluator, Proceedings of the International conference on Dependable Systems and Networks (DSN'02) p. 542, IEEE, 2002.

The Netflix Tech Blog, Chaos Monkey, http://techblog.netflix.com/2011/07/netflix-simian-army.html, Jul. 19, 2011.

Gunawi et al. Failure as a Service (FaaS): A Cloud Service for Large-Scale, Online Failure Drills, University of Califomia, Berkeley, Berkeley 3 (2011).

* cited by examiner

INJECTING FAULTS AT SELECT EXECUTION POINTS OF DISTRIBUTED APPLICATIONS

FIELD OF THE INVENTION

Embodiments of the invention generally relate to information technology, and, more particularly, to distributed application management.

BACKGROUND

Failure testing is a common and important aspect for distributed applications and systems. However, existing failure testing approaches face many challenges. For example, existing approaches do not include guided and/or precise fault injection (FI) techniques that would enable developers, testers, and/or operations agents to test specific scenarios. Existing FI tools are statistical in nature, and require a large number of injections to gain sufficient confidence and coverage. Additionally, such FI tools do not include an ability to insert faults at precise locations for concurrent requests, nor do existing FI tools include an ability to correlate unit test cases with precise fault injections.

Accordingly, a need exists for techniques for inserting faults at select execution points and scenarios of distributed applications.

SUMMARY

In one aspect of the present invention, techniques for injecting faults at select execution points of distributed applications are provided. An exemplary computer-implemented method can include steps of monitoring a run-time state of each of multiple components of a distributed application to determine one or more sequence of events that triggers a fault injection point at one of the multiple components; defining a fault injection scenario in a specification based on said monitoring, wherein said fault injection scenario comprises a description of one or more sequence of events during which an intended fault is to be injected to a target component of the multiple components at one selected event; and executing the fault injection defined in the specification to perform injection of the intended fault during run-time of the distributed application.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes techniques for inserting faults at select execution points and scenarios of distributed applications. At least one embodiment of the invention includes executing a fault injection (FI) at a given target point defined in terms of causal events of messages and C standard library (LIBC) and/or system calls, as well as discovering such causal events and corresponding dependencies and/or sequences. Additionally, an aspect of the invention includes coordinating distributed components for a fault injection during run-time of the given distributed application. As described further herein, a centralized control server can be implemented to monitor the run-time state of each distributed component, track the current execution flow, and determine whether a condition is met for triggering the fault injection.

At least one embodiment of the invention includes pre-injection analysis based on collected execution traces to gain internal semantics of target systems. Such analysis can be utilized to determine the sequence of events that leads to the intended injection point(s). Further, at run-time, at least one embodiment of the invention includes intercepting function calls (for example, LIBC) to match to a given event sequence and guiding the fault insertion at the pre-determined point(s).

Additionally, an aspect of such an embodiment of the invention includes generating an FI specification that specifies event dependencies for inserting faults. By way of example, the FI specification can include a human-readable specification for defining fault injection scenarios. Also, driving one or more FI experiments can include taking input from an FI specification and coordinating events at target processes distributed across machines to perform precise fault injection.

Figure 1:
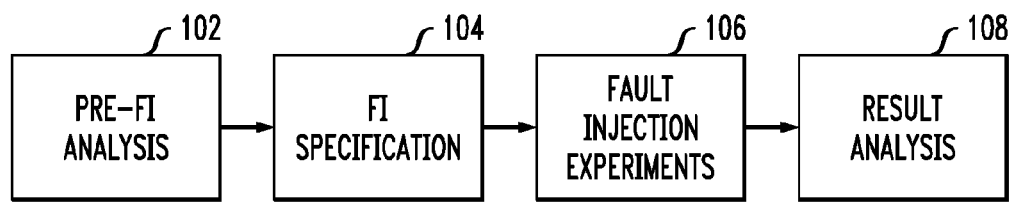
FIG. 1 is a diagram illustrating a process flow for conducting fault injection, according to an embodiment of the present invention.

FIG. 1 is a diagram illustrating a process flow for conducting fault injection, according to an embodiment of the present invention. Step 102 includes pre-FI analysis. Such analysis can include profiling the given system under various workloads to identify FI points and event dependencies. Accordingly, pre-injection analysis can additionally include flow generation across multiple processes. Step 104 includes generating an FI specification. As detailed herein, an FI specification defines precise fault injection scenarios, and allows a user (or automated tools) to define FI scenarios based on event dependencies discovered from the pre-injection analysis carried out in step 102. By way of example, an FI specification might include an entry that instructs: "AT Event x INJECT Fault TO Target."

Accordingly, an FI specification can include a description of an event and/or a sequence of events (a function, matching data, etc.) at and/or during which a fault is to be injected at a designated target. A fault can indicate, for example, an application crash, network congestion, a lack of memory and/or disk space, an LIBC call return error, a memory, disk or network corruption, a configuration error, etc. Additionally, a designated target for the fault injection can include a particular function, process, virtual machine (VM), physical machine, etc.

Referring back to FIG. 1, in step 106, a tool is developed to automate the FI experiments. By way of example, further description of step 106 is provided below in connection with FIG. 2. Step 108 includes analyzing results of the experiments conducted in step 106. By way of example, logs (derived from the experiments) can be collected and loaded into a mechanism that allows a user to visually navigate injections, log files, message types, etc. Additionally, at least one embodiment of the invention includes providing statistics pertaining to the conducted injections, as well as providing a mean for users to look-up failure scenarios.

Figure 2:
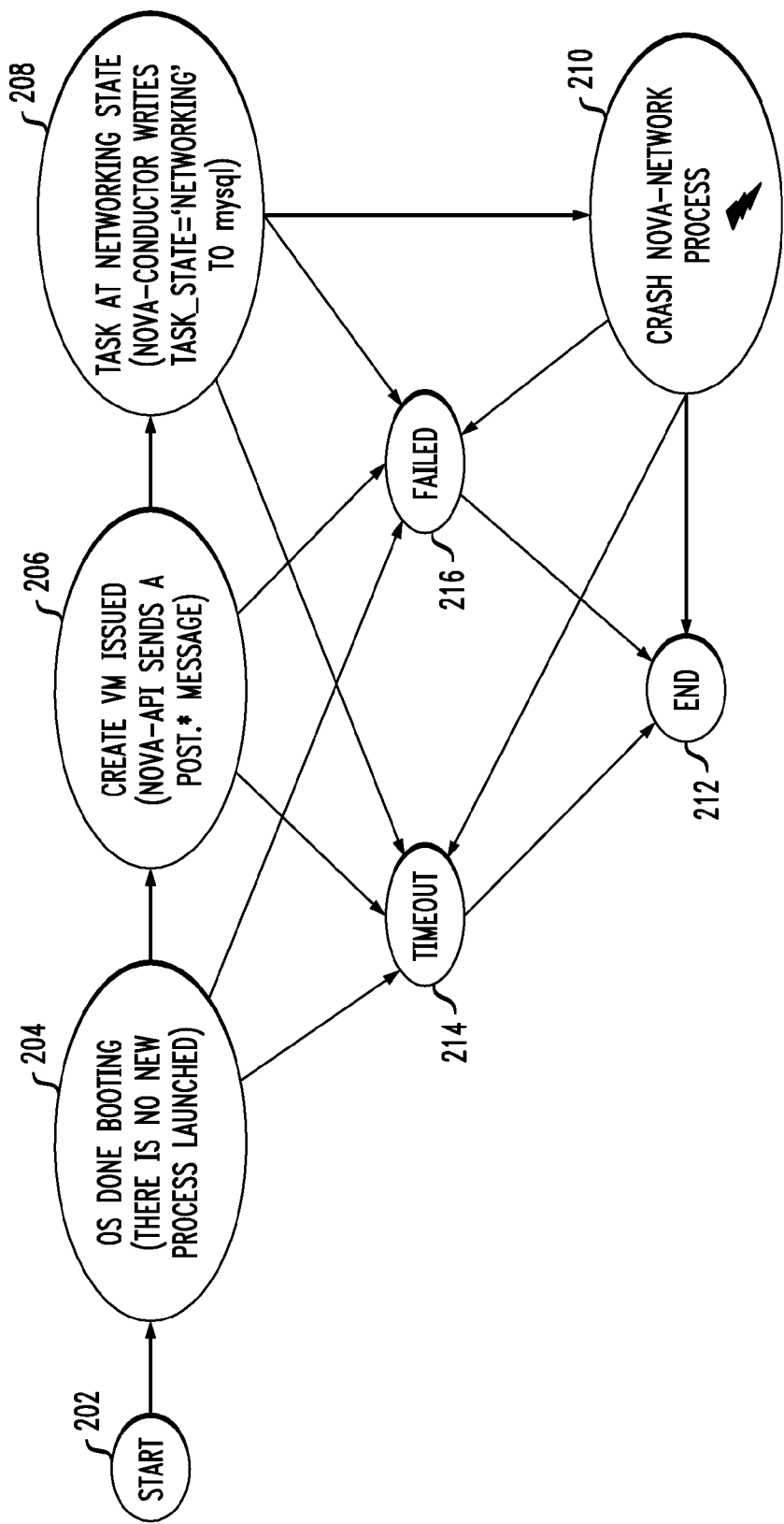
FIG. 2 is a diagram illustrating example flow process for executing an injection driven by a state machine, according to an embodiment of the present invention.

FIG. 2 is a diagram illustrating example flow process for executing an injection driven by a state machine, according to an embodiment of the present invention. The flow process depicted in FIG. 2 is an example of an aspect of the invention developed via step 106 in FIG. 1. By way of illustration, FIG. 2 depicts a sequence of actions carried out via the internal operation of an FI tool to drive an injection. Step 202 includes starting the flow process, while step 204 includes determining that the operating system (OS) has completed booting (that is, there are no new processes launched). Step 206 includes determining that a "Create a virtual machine (VM)" message has been issued. As noted in the example depicted in FIG. 2, a component (that is, a software process) identified as nova-api sends a message pertaining to this task to the nova-conductor component.

Step 208 includes determining that a task is at a networking state. By way of example, there is a variable, task_state, in the OpenStack software that indicates the current state. Note that FIG. 2 illustrates an example of the state machine which drives targeted fault injection, and the FIG. 2 example shows that the state machine can include information specific to the monitored distributed software. As noted in the example depicted in FIG. 2, nova-conductor writes a message to mysql indicating that task_state='networking.' Step 210 includes crashing the nova-network process, and step 212 includes ending the flow process. Additionally, as described below, step 214 includes a performing a timeout and step 216 includes noting a failure.

In conjunction with the example depicted in FIG. 2, at least one embodiment of the invention can include, as detailed herein, providing a chart of execution flows of a given distributed application to a user. The user can pinpoint any injection point in the granularity of a message and/or system call/LIBC call, and the fault injection can be performed as described herein and corresponding results can be obtained.

In an example embodiment of the invention, after the user pinpoints the injection point in the chart, the user writes an FI specification to precisely describe the relevant flows (messages or system calls/LIBC calls) that lead to the injection point in the chart. Such an embodiment further includes reading the FI specification and launching the target distributed application. The guidelines given in the FI specification are executed via use of a state-machine driven mechanism (such as depicted via FIG. 5). By following the state machine, the system can successfully perform the requested injection (such as the "crash nova-network process" injection noted in step 210 in FIG. 2). Further, if an error or issue arises during the fault injection experiment, the experiment may fail and/or the system will terminate this experiment (as indicated by the "Timeout" and "Failed" actions of step 214 and 216, respectively, in FIG. 2).

Figure 3:
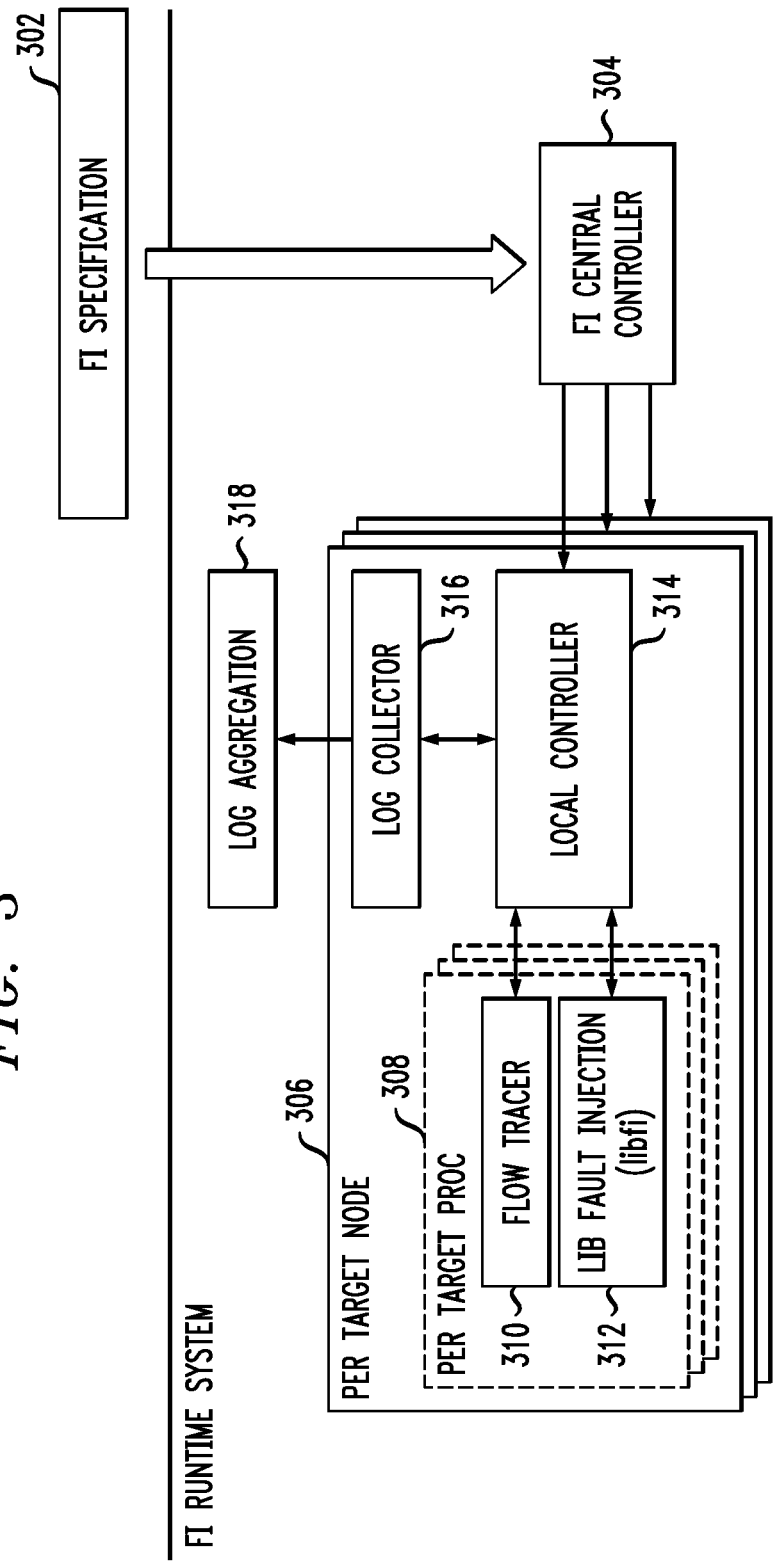
FIG. 3 is a block diagram illustrating an example embodiment, according to an aspect of the invention.

FIG. 3 is a block diagram illustrating an example embodiment of the invention. By way of illustration, FIG. 3 depicts an FI specification 302, an FI central controller 304 and a per target node 306 within an FI run-time system. As further described herein, the FI central controller 304 operates in an event-driven fashion to drive the injection. As also detailed herein, target applications can include multiple processes across multiple nodes. In the example depicted in FIG. 3, the target node 306 includes a target process component 308, which further includes a flow tracer 310 and a library fault injection (LIBFI) component 312. Also, the target node 306 includes a local controller 314, which interacts with the FI central controller 304 as well as with the flow tracer 310 and the library fault injection component 312. The local controller 314 further interacts with a log collector component 316, which outputs a log aggregation component 318.

Figure 4:
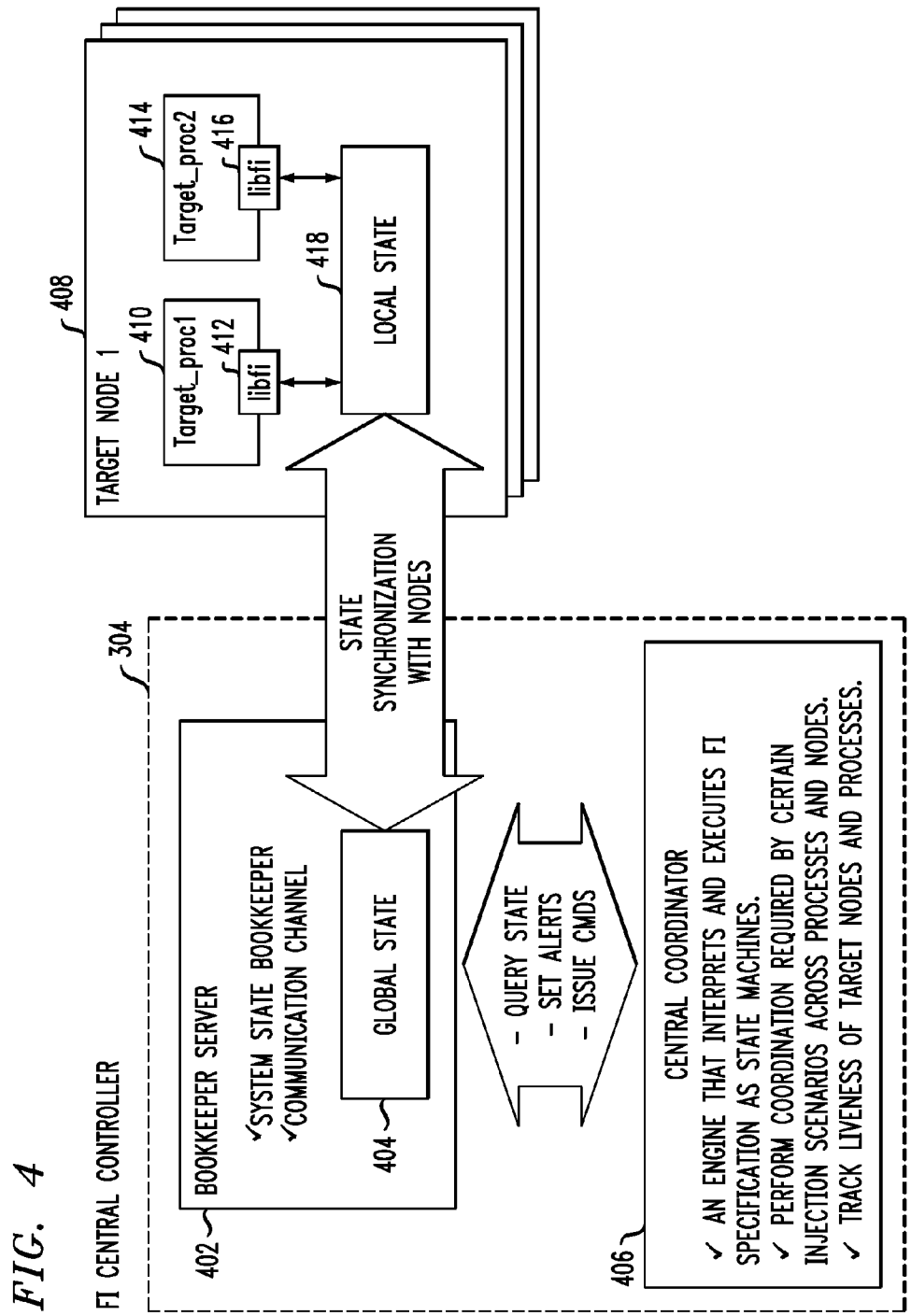
FIG. 4 is a block diagram illustrating an example embodiment, according to an aspect of the invention.

As depicted in FIG. 3, the FI specification 302 is a specification of the target FI scenario, while the FI central controller 304 is a central unit that coordinates the fault injection components distributed in different nodes for executing the fault injection scenario specified in the FI specification 302. FIG. 4, for example, depicts the internal structure of a FI central controller.

The per target node 306 includes any node (VM or physical machine) that has part of the monitored distributed application (for example, OpenStack) running. Within the per target node 306, the per target process 308 includes any process of the monitored distributed application (for example, OpenStack). Additionally, the flow tracer 310 includes a component (for example, library code) of the fault-injection scheme that monitors execution of the per target process 308. Each process 308 has a flow tracer 310 installed.

Further, the library fault injection component 312 includes a component (for example, library code) of the fault-injection scheme that performs the fault injection work inside the process 308. Each process 308 has a library fault injection component 312 installed. Also, the local controller 314 includes a component of the fault-injection scheme that coordinates the flow tracer 310 and the library fault injection component 312 for carrying out the targeted fault injection according to the commands sent by the FI central controller 304.

Additionally, as depicted in FIG. 3, the log collector 316 includes a component of the fault-injection scheme that collects logs of the distributed application. As the log information can be used in the FI specification 302 to describe a fault-injection scenario, the local controller 314 acquires the log information to execute the FI specification 302 for the targeted fault injection. Further, in one or more embodiments of the invention, the log aggregation component 318 includes the component of the fault-injection scheme that aggregates collected logs from different components of the monitored distributed application for further use.

FIG. 4 is a block diagram illustrating an example embodiment, according to an aspect of the invention. By way of illustration, FIG. 4 depicts FI central controller 304 and a target note 408. The FI central controller 304 includes a bookkeeper server 402, which further includes a global state component 404. The global state component 404 includes the states of all per target processes (such as component 308 in FIG. 3), flow tracer components (such as component 310 in FIG. 3), library fault injection components (such as component 312 in FIG. 3) and local controllers (such as component 314 in FIG. 3) in all per target nodes. The bookkeeper server 402 acts as a system state bookkeeper and includes a communication channel. The FI central controller 304 additionally includes a central coordinator component 406, which acts as a state-machine driven mechanism and interacts with the bookkeeper server 402 to query states, set alerts and issue commands. Specifically, the central coordinator component 406 (additionally detailed in connection with FIG. 5) includes an engine that interprets and executes FI specifications as state machines. The central coordinator component 406 further performs coordination required by certain injection scenarios across processes and nodes, and also tracks live-ness of target nodes and processes.

As noted, FIG. 4 also depicts a target node 408. The target node 408 includes target processes 410 and 414, which have corresponding LIBFI components, 412 and 416, respectively. Each process of the target node 408 has its LIBC calls (or system calls) intercepted by a LIBFI library. The target node 408 also maintains data structures and other data in a local state component 418, wherein such data are mapped to local memory-mapped files. The local state component 418 of the target node 408 performs state synchronization with the global state component 404 of the bookkeeper server 402 of the FI central controller 304. Additionally, the target node 408 reads commands and states from FI central controller 304 via the local state component 418 and takes actions accordingly.

At least one embodiment of the invention, such as the example embodiment depicted in FIG. 4, can include extending to handle concurrent requests. In such an embodiment, a prefix (for example, a request identifier (ID)) is added to the first message of the target request (for example, creating a VM, such as noted in step 206 of FIG. 2). Subsequently, the relevant LIBFI propagates this prefix to all intercepted messages in the same flow. To maintain the format of the original message, the prefix is added before each sending, and removed after each receipt so that the application does not observe the prefix. Additionally, in at least one embodiment of the invention, the prefix is used in the FI specification to match the events that belong to the target request only.

Figure 5:
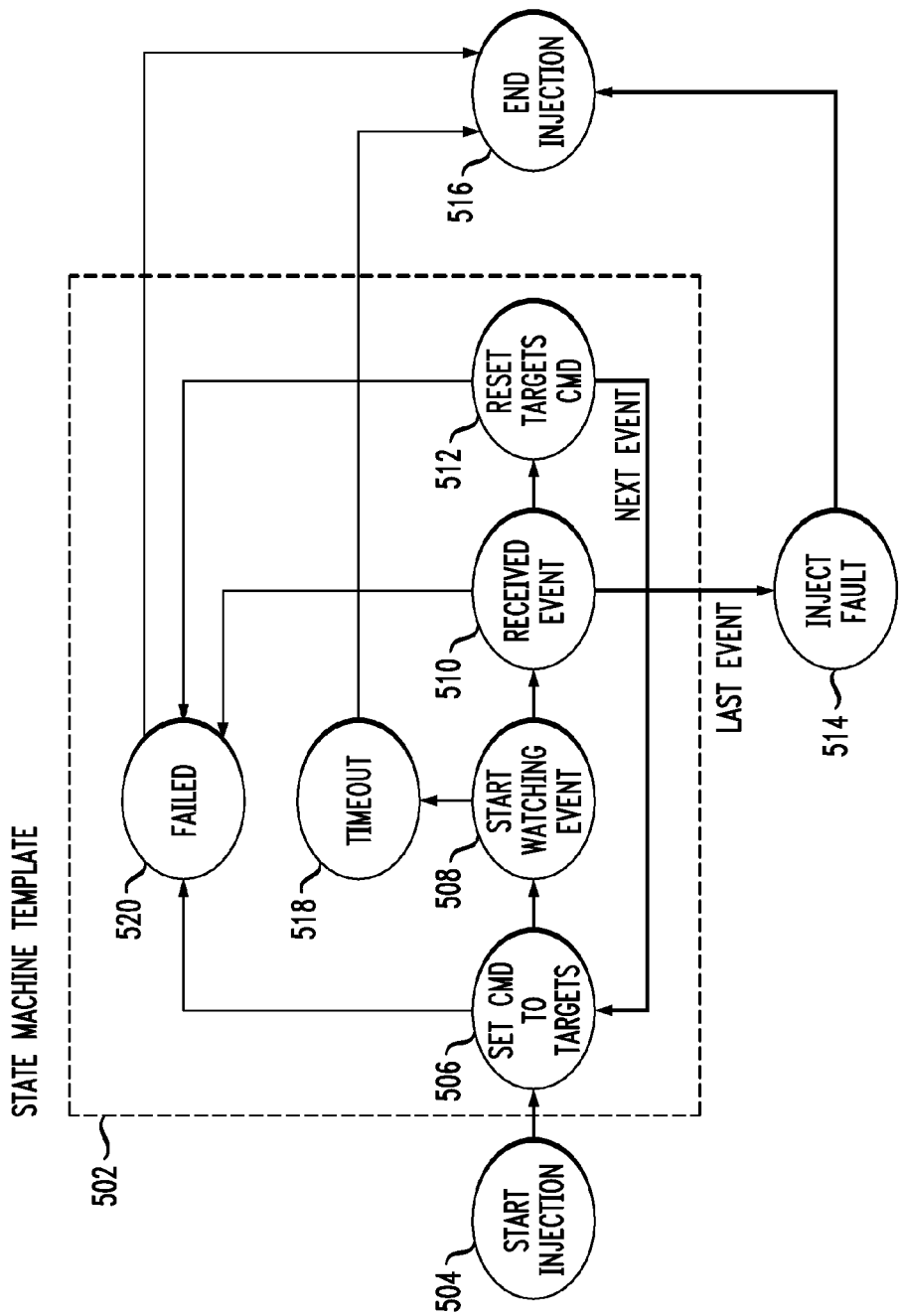
FIG. 5 is a diagram illustrating a central coordinator component, according to an embodiment of the present invention.

FIG. 5 is a diagram illustrating a central coordinator component, according to an embodiment of the present invention. By way of illustration, FIG. 5 depicts a state machine template 502 that interprets and executes an FI specification, as denoted by steps 506 through 514. Step 504 includes starting an injection process. Step 506 includes setting and sending a command to one or more targets, and step 508 includes commencing a watch for pre-determined events. If an error and/or issue arises during step 508, a timeout 518 can be enacted, which ultimately leads to the end of the injection process in step 516.

Step 510 includes determined the received pre-determined event(s) and step 512 includes resetting the target commands. As also illustrated in FIG. 5, an error and/or issue arising in step 506, 510 and/or 512 can result in a failure 520, which ultimately leads to the end of the injection process in step 516. Further, step 514 includes injecting the fault at the noted target in response to the received event(s).

Fault injectors, as implemented in accordance with one or more embodiments of the invention, can include process-level fault models and node-level fault models. Process-level fault models are implemented inside LIBFI and invoked at a LIBC call interception. Such faults can include, for example, a process crash, a connection loss, or a network delay. Node level fault models are implemented at a local controller, and can include faults such as, for example, a lack of memory and/or disk, OS kernel crash, VM migration, or a configuration change.

Types of fault injections, as implemented in accordance with one or more embodiments of the invention, can include statistical fault injections and targeted fault injections. A statistical fault injection includes conducting a systematic campaign of experiments by performing FIs exhaustively at all execution points of the target application, or probabilistically (with certain distribution) at select execution points. By way of example, faults can be injected at each LIBC call of the target application, or at a random occasion during a given period. Additionally, in statistical fault injections, a certain granularity can be selected, such as, for example, per LIBC call, function call, instruction level, or time.

A targeted fault injection includes conducting a set of FIs with specified scenarios and fault points. By way of example, a fault can be injected immediately after the target process receives a certain message. Further, at least one embodiment of the invention can include implementing a hybrid fault injection, which includes a statistical FI under a certain condition via use of a targeted FI.

Figure 6:
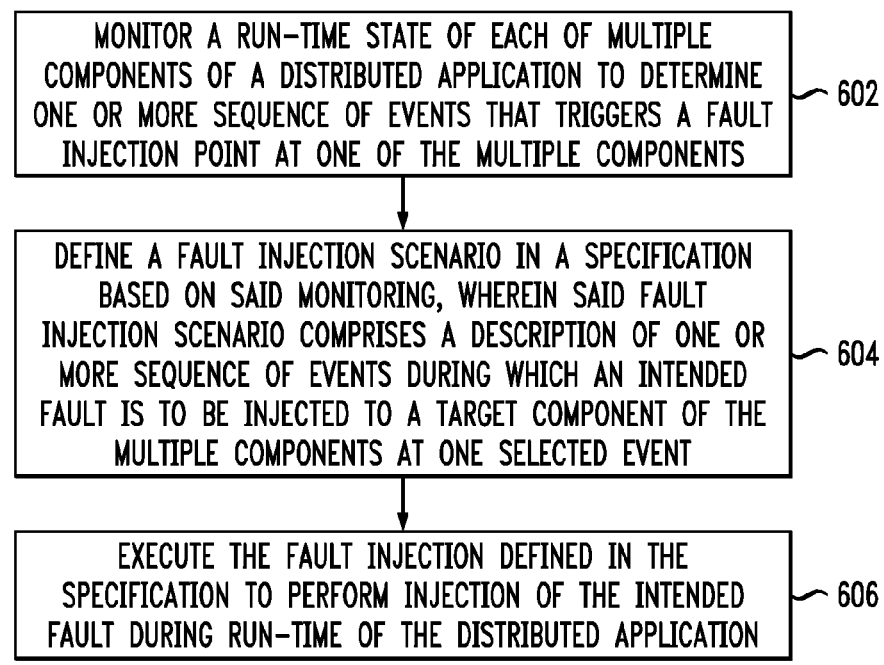
FIG. 6 is a flow diagram illustrating techniques according to an embodiment of the invention.

FIG. 6 is a flow diagram illustrating techniques according to an embodiment of the present invention. Step 602 includes monitoring a run-time state of each of multiple components of a distributed application to determine one or more sequence of events that triggers a fault injection point at one of the multiple components. Monitoring can include comprises monitoring the run-time state of each of the multiple components based on collected execution traces of the distributed application. Additionally, monitoring can include monitoring the run-time state of each of the multiple components of the distributed application under multiple workloads.

Step 604 includes defining a fault injection scenario in a specification based on said monitoring, wherein said fault injection scenario comprises a description of one or more sequence of events (for example, a sequence of log events) during which an intended fault is to be injected to a target component of the multiple components at one selected event. Defining can include defining a fault injection scenario based on one or more event dependencies discovered from said monitoring.

Step 606 includes executing the fault injection defined in the specification to perform injection of the intended fault during run-time of the distributed application. The intended fault can include, for example, an application crash, network congestion, a lack of memory and/or disk space, a memory, disk or network corruption and/or a configuration error. Also, the target component can include, for example, a given function, a given process, a virtual machine, and/or a physical machine.

The techniques depicted in FIG. 6 can also include analyzing results from said injection of the intended fault. Analyzing can include collecting multiple logs derived from said injection of the intended fault. Analyzing can also include generating statistics pertaining to said injection of the intended fault. Additionally, at least one embodiment of the invention can include displaying said multiple logs to a user. Further, the techniques depicted in FIG. 6 can include executing injection of multiple intended faults concurrently.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 7:
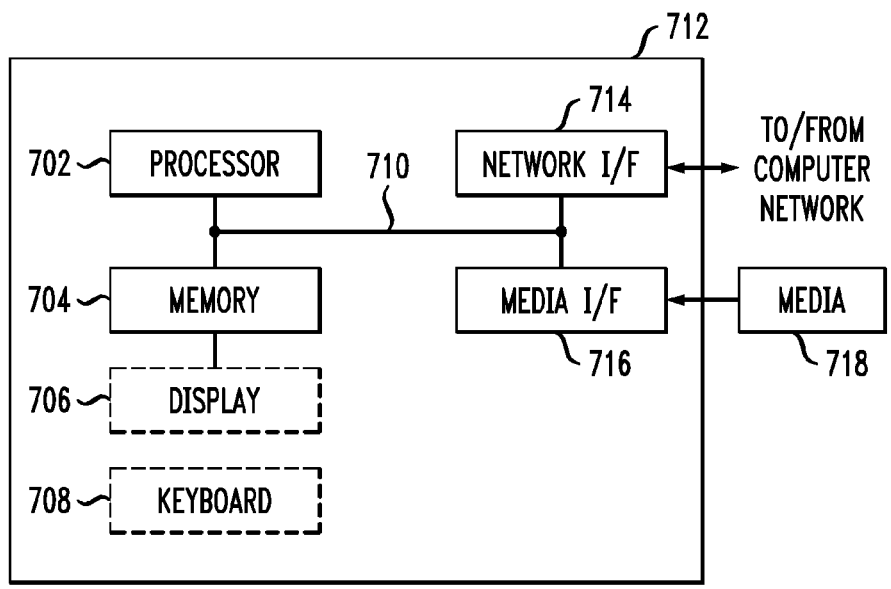
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, determining fault points without a requirement of knowing application semantics.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
monitoring a run-time state of each of multiple distributed components of a distributed application that comprises a variable number of multiple states, based on collected execution traces of the distributed application, to determine one or more sequence of events that triggers a fault injection point at each of the multiple components, wherein said one or more sequence of events comprises a sequence of log events;
defining a scenario of multiple fault injections in a specification based on said monitoring, wherein said scenario comprises a description of one or more sequence of events during which each of the multiple faults is to be injected across the multiple distributed components at one selected event, and wherein said defining comprises defining the scenario based on one or more event dependencies discovered from said monitoring; and
executing the multiple fault injections defined in the specification concurrently across the multiple distributed components of the distributed application during run-time of the distributed application;
wherein said monitoring, said defining, and said executing are carried out by at least one computing device.

2. The method of claim 1, wherein said monitoring comprises monitoring the run-time state of each of the multiple distributed components of the distributed application under multiple workloads.

3. The method of claim 1, wherein each of the multiple faults comprises at least one of an application crash, network congestion, a lack of memory and/or disk space, a memory, disk or network corruption and a configuration error.

4. The method of claim 1, wherein each of the multiple distributed components comprises at least one of a given function, a given process, a virtual machine, and a physical machine.

5. The method of claim 1, comprising:
analyzing results from said multiple fault injections.

6. The method of claim 5, wherein said analyzing comprises collecting multiple logs derived from said multiple fault injections.

7. The method of claim 6, comprising:
displaying said multiple logs to a user.

8. The method of claim 5, wherein said analyzing comprises generating statistics pertaining to said multiple fault injections.

9. An article of manufacture comprising a non-transitory computer readable storage medium having computer readable instructions tangibly embodied thereon which, when implemented, cause a computer to carry out a plurality of method steps comprising:
monitoring a run-time state of each of multiple distributed components of a distributed application that comprises a variable number of multiple states, based on collected execution traces of the distributed application, to determine one or more sequence of events that triggers a fault injection point at each of the multiple components, wherein said one or more sequence of events comprises a sequence of log events;
defining a scenario of multiple fault injections in a specification based on said monitoring, wherein said scenario comprises a description of one or more sequence of events during which each of the multiple faults is to be injected across the multiple distributed components at one selected event, and wherein said defining comprises defining the scenario based on one or more event dependencies discovered from said monitoring; and
executing the multiple fault injections defined in the specification concurrently across the multiple distributed components of the distributed application during run-time of the distributed application.

10. The article of manufacture of claim 9, wherein said monitoring comprises monitoring the run-time state of each of the multiple distributed components of the distributed application under multiple workloads.

11. A system comprising:
a memory; and
at least one processor coupled to the memory and configured for:
monitoring a run-time state of each of multiple distributed components of a distributed application that comprises a variable number of multiple states, based on collected execution traces of the distributed application, to determine one or more sequence of events that triggers a fault injection point at each of the multiple components, wherein said one or more sequence of events comprises a sequence of log events;
defining a scenario of multiple fault injections in a specification based on said monitoring, wherein said scenario comprises a description of one or more sequence of events during which each of the multiple faults is to be injected across the multiple distributed components at one selected event, and wherein said defining comprises defining the scenario based on one or more event dependencies discovered from said monitoring; and
executing the multiple fault injections defined in the specification concurrently across the multiple distributed components of the distributed application during run-time of the distributed application.

* * * * *